F. W. MEYER.
CONTROLLING AND REGULATING APPARATUS.
APPLICATION FILED JAN. 13, 1917.

1,353,815.

Patented Sept. 21, 1920.
3 SHEETS—SHEET 1.

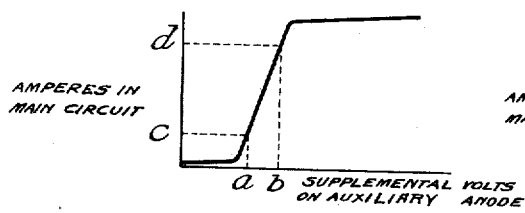
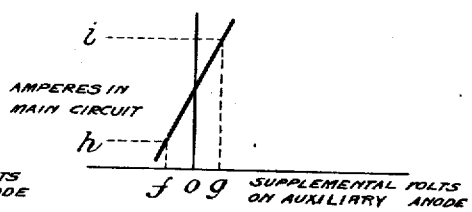
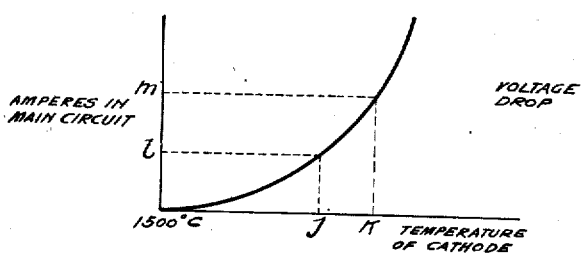
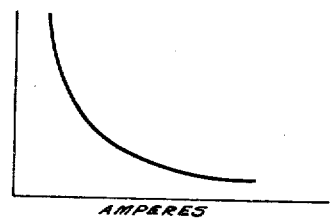
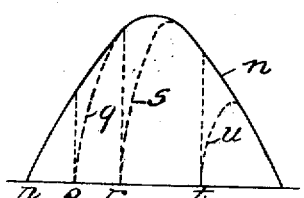

F. W. MEYER.
CONTROLLING AND REGULATING APPARATUS.
APPLICATION FILED JAN. 13, 1917.
1,353,815. Patented Sept. 21, 1920.
3 SHEETS—SHEET 3.
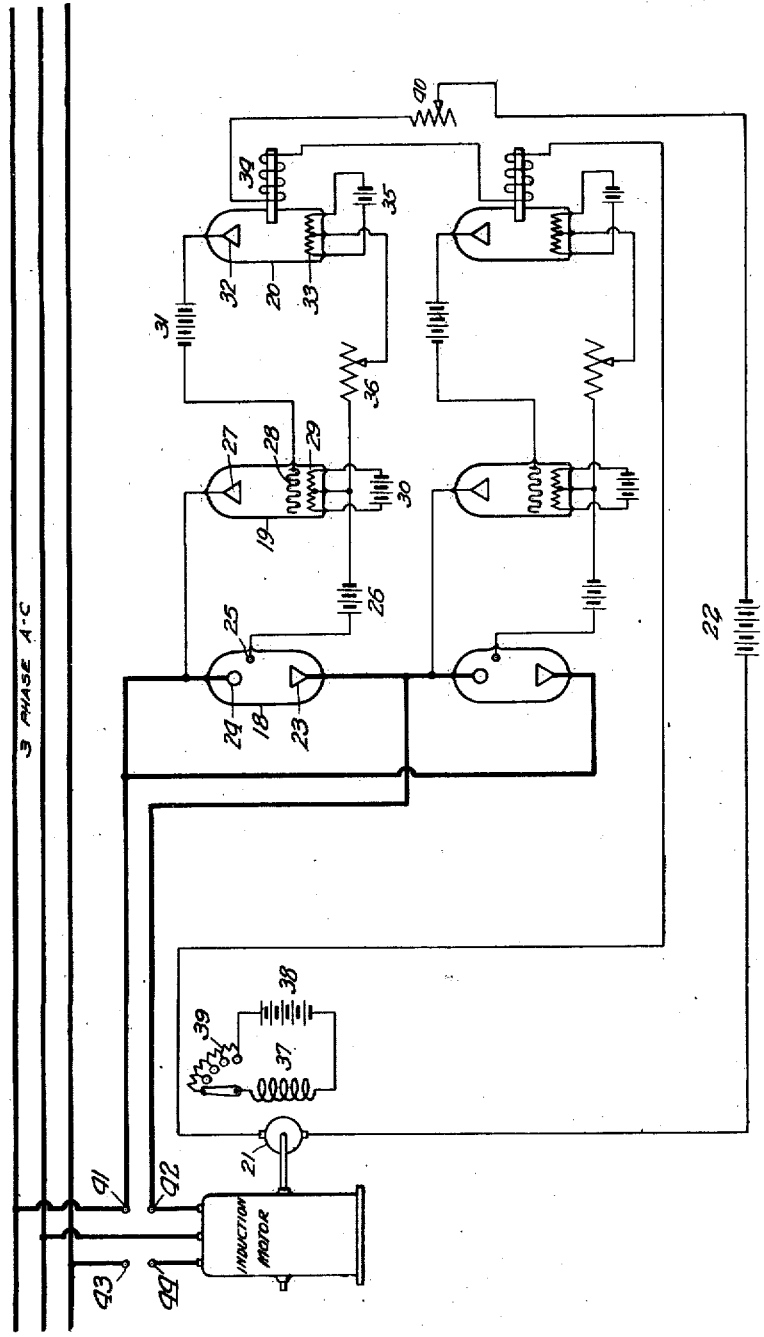

UNITED STATES PATENT OFFICE.

FRIEDRICH W. MEYER, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROLLING AND REGULATING APPARATUS.

1,353,815.  Specification of Letters Patent.  Patented Sept. 21, 1920.

Application filed January 13, 1917. Serial No. 142,243.

*To all whom it may concern:*

Be it known that I, FRIEDRICH WILHELM MEYER, a citizen of the German Empire, residing at Milwaukee, in the county of Milwaukee and State of Wisconsin, have invented new and useful Improvements in Controlling and Regulating Apparatus, of which the following is a specification.

This invention relates to controlling and regulating apparatus.

More particularly it relates to controlling and regulating apparatus for energy converters such, for example, as dynamo-electric machines.

An electric motor, as ordinarily employed, when subjected to a variation in load or impressed voltage, will vary its speed unless regulating means are provided to compensate for the variation in conditions.

Likewise, an electric generator, as ordinarily employed, when subjected to a variation in speed or load, will vary its voltage or current unless regulating means are provided to compensate for the variation in conditions.

Electromagnets, switches, windings, and resistance are ordinarily the means through which a motor and other dynamo-electric machines are regulated. The self-induction of the electromagnets and windings, the mechanical inertia of the switches, the inertia and self-induction of the motor or generator, and also other things, tend to make the regulation tardy and cause it to overrun and hunt, and the resistance consumes considerable energy.

An object of the present invention is to produce more sensitive and stable regulation and eliminate or lessen hunting.

Another object is to provide regulating means which will respond to slight variations in conditions and accurately compensate therefor.

Another object is to produce a regulating effect substantially coincidently with the need therefor.

Another object is to produce a regulating effect substantially coincidently and in accordance with a variation in load and power conditions of the machine to be regulated.

Another object is to lessen the energy consumed.

Another object is to produce instantaneously upon a variation in conditions an amplified regulating effect.

Another object is to facilitate controlling the speed or torque of an electric motor.

The invention will be explained herein as applied to control and regulate an electric motor, but it is susceptible of being adapted to control and regulate other dynamo-electric machines. It may also be adapted to control and regulate other energy conversion machines.

In accordance with this invention, as employed to regulate a motor, the motor is regulated primarily through the agency of an electroionic valve, the effect of which is controlled by means which respond substantially coincidently with variations in load or other conditions.

One electroionic valve may be employed to control another so as to multiply the effect, as for instance, one may be arranged to act as a relay which responds to the variations in conditions and in turn controls another which regulates the motor.

The invention is diagrammatically illustrated in the accompanying drawings in which—

Fig. 3 shows a curve of the current between the anode and cathode under variations in the voltage applied between the auxiliary anode and the cathode in a valve of the luminous discharge low pressure type;

Fig. 4 shows a curve of the variations in current between the anode and cathode under variations in the voltage applied between the auxiliary anode and the cathode in a valve of the dark discharge type;

Fig. 5 shows a curve of the current between the anode and the cathode under variations in the temperature of the cathode in a dark or luminous discharge valve;

Fig. 6 is a curve of the variation in the voltage drop between the anode and cathode under variations in the the current in either an alternating current or direct current valve;

Fig. 7 represents an alternating current pulse and the way it may be modified by the electroionic valve to control the motor; and Fig. 8 is a diagram of the controlling and regulating apparatus for a three-phase induction motor, the apparatus for only one circuit being shown.

Figure 1:
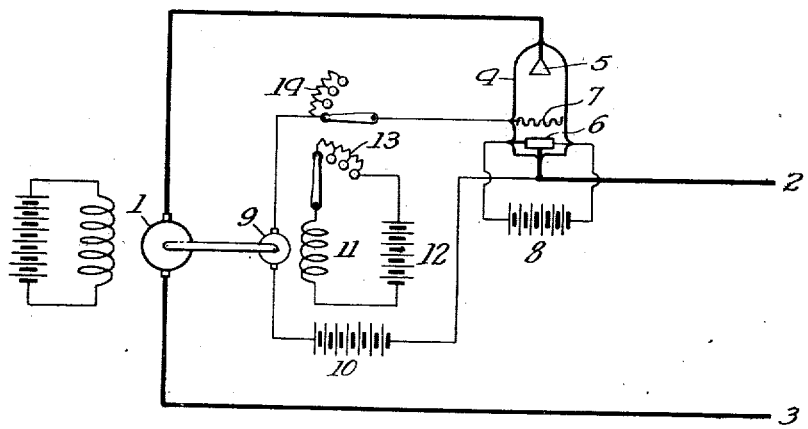
Figure 1 shows the apparatus applied to a direct current motor, the electroionic valve being provided with an auxiliary electrode or anode to control its effect.

Fig. 1 will first be described. It shows a direct current motor 1 which is supplied with energy from the source 2—3 and has its field separately excited. The energy is transmitted through an electroionic valve 4 which may be assumed to be of either a dark discharge or a luminous discharge type of very low pressure. This valve has an anode 5, a cathode 6 and an auxiliary anode 7. The cathode is normally heated by current supplied from battery 8 or other source. The anode 7 is in the form of a grid. The effect of the electroionic valve is primarily controlled by an auxiliary dynamo-electric machine or tachometer 9 driven by the motor so that its speed will vary directly and simultaneously with the motor speed, but other ways may be adopted to control the effect of this valve substantially simultaneously with the variations in conditions. The tachometer is arranged in opposition to a battery 10 and they are connected in series to the auxiliary anode 7 and the cathode 6 to impress a supplemental voltage between the same, which will depend upon the difference between the battery voltage and the tachometer voltage.

If a valve of the luminous discharge low pressure type be employed the supplemental voltage is always in the same direction as the main voltage, while if a valve of the dark discharge type be employed the supplemental voltage may be in one direction or the other. In any case a variation in the supplemental voltage will cause a variation in the main current through the electroionic valve.

The variation in main current under variations in the supplemental voltage are represented in Figs. 3 and 4. In Fig. 3 the supplemental voltage is assumed to be always in the same direction. In Fig. 4 the supplemental voltage changes from one direction to the other as the tachometer voltage rises and falls so that at one time the supplemental voltage may be in the same direction as the main voltage and at another in opposition thereto.

The tachometer field 11 may be energized by current from a battery 12 and controlled or regulated by a field rheostat 13.

Whenever the supplemental voltage impressed between the auxiliary anode 7 and the cathode 6 is varied, the voltage drop between the anode 5 and the cathode 6 will be varied, and a slight variation in the former voltage will cause a material variation in the voltage drop. Accordingly, when the motor speed tends to change under variations in load or other conditions, the tachometer speed will simultaneously vary and simultaneously alter the supplemental voltage impressed between the auxiliary anode 7 and the cathode 6, thereby causing sufficient variations in energy in the main circuit to compensate for the variation in conditions and keep the motor speed practically the same.

Changes in the speed of the motor, brought about by variations in the load carried thereby, in the impressed voltage or in other load and power conditions are instantaneously compensated for by corrective forces initiated substantially coincidently or simultaneously with the occurrence of a variation and acting on the motor in substantial synchronism with a variation.

Of course, other ways may be provided to control the supplemental voltage impressed between the auxiliary anode 7 and the cathode 6.

The motor speed or torque may be varied at will by varying the field resistance 13 or the resistance 14, or in other ways, to alter the supplemental voltage, or otherwise control the effect of the electroionic valve.

Figure 2:
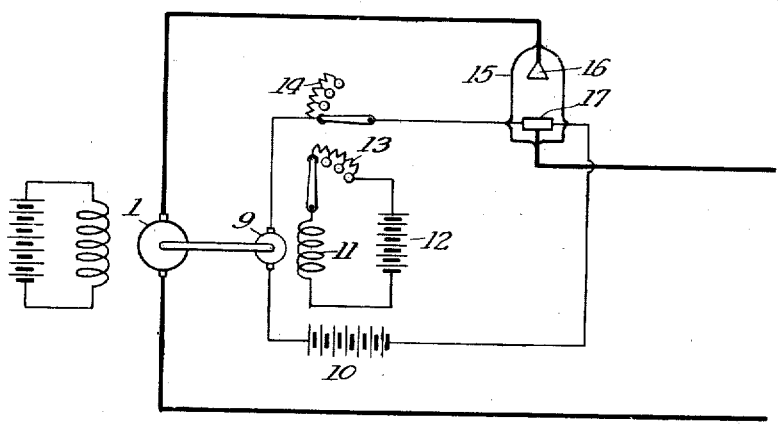
Fig. 2 shows similar apparatus, the electroionic valve being provided with a heated cathode to control its effect.

Fig. 2 shows an electroionic valve 15 which is assumed to be of either the dark discharge, the luminous discharge or the arc discharge type. It has an anode 16 and a variably heated cathode 17. The other apparatus is the same is in Fig. 1. The tachometer 9 and the battery 10 are in opposition, the battery voltage predominating, and they are connected in series with the heated cathode 17. Whenever the tachometer voltage varies, the current through the heated cathode will vary thereby altering the cathode temperature. This will cause a material change in the voltage drop between the anode 16 and the cathode 17 and consequently the main current will vary.

The variation in the main current under variations in the cathode temperature is represented in Fig. 5.

The apparatus shown in Figs. 1 and 2 is susceptible of various modifications and may readily be adapted to control an alternating current motor.

Fig. 3 is a curve showing the variations of the main current under variations in the supplemental voltage between the auxiliary anode and the cathode in a luminous discharge valve of very low pressure, which is connected to a constant voltage in series with a resistance. If the valve is connected in series with a motor, the current has the same tendencies, the final current in this case being a function of the load. The supplemental voltage in this case is always in the same direction as the main voltage. The ordinates represent the main current or amperes, and the abscissæ the supplemental voltage. A variation in the supplemental voltage between for instance the points *a—b* causes a variation in the main current between the points *c—d* and the variation in current is much greater than the variation in voltage.

Fig. 4 illustrates a curve showing the tendencies for the variations in the main current under variations in the supplemental voltage between the auxiliary anode and the cathode in a valve of the dark discharge type, the supplemental voltage being changed from one direction to the other. The ordinates represent the main current or amperes and the abscissæ the supplemental voltage. The point *o* indicates the current when the battery voltage and the tachometer voltage balance. The current will rise or fall from this point depending upon which voltage predominates and a variation in voltage between for instance the points *f* and *g* will give a variation in current between the points *h* and *i*. The variation in the main voltage is much greater than the change in the supplemental voltage and the main current varies correspondingly.

Fig. 5 illustrates a curve showing the tendencies for the variations in current under variations in cathode temperature in a dark or luminous discharge valve, the battery voltage predominating. Variations in the temperature between for instance the points *j—k* will produce variations in current between the points *l—m* which are much greater than the variations in temperature. When the tachometer voltage falls, the heating current will rise, thereby lessening the resistance in the electroionic valve and permitting an increase in energy to compensate for the variation in conditions.

Fig. 6 illustrates a curve showing the self-regulating effect of the electroionic valve or the variations in the drop across the discharge path thereof under variations in current in either an alternating current or a direct current valve. The ordinates represent voltage drop and the abscissæ amperes. When the current rises the voltage drop falls and vice versa when the current decreases the voltage drop rises, thereby facilitating the required variation in energy and causing the electroionic valve to produce a self-regulating effect.

If the valve is provided with an auxiliary anode the current of the latter has the same effect on the voltage drop as the main current, and a similar influence may also be produced by heating of the cathode.

The fact that a given change in the supplemental voltage or the cathode temperature, or other controlling condition, will create a material change in the main current or energy enables the electroionic valve to respond to an infinitesimal change in conditions and alter the current or energy sufficiently to compensate for this change.

If an alternating current dynamo electric machine is employed, the electroionic valve may be provided with electrodes adapted to transmit opposite pulses, or two electroionic valves may be employed. Of course, various ways may be adopted to adapt the invention to alternating current.

Where the electroionic valve operates under alternating current the duration and magnitude of the current pulses may also be regulated as follows: Considering a single pulse or half wave of current, the transmission of energy between the electrodes will start only when a predetermined condition exists. The starting of the arc may thus be controlled by means of an ignition arc or in other ways.

When the motor is operating at a given speed, the arc will start at a certain point in the pulse. If the load be increased the starting point will be advanced by the regulator to give more energy and if it be decreased the starting point will be retarded to reduce the energy. Thus the pulse is modified under varying conditions to vary the energy transmitted to the motor. The pulse may even be entirely eliminated, and pulses may sometimes be eliminated in such sequence that the frequency of the cycles will be changed.

Fig. 7 represents an alternating current pulse of the source of supply and the way it may be modified or eliminated, depending upon the effect of the electroionic valve. The full line *n* represents the form of the current pulse under the assumption that the circuit consists of pure ohmic resistance. The current will not start at the beginning of the pulse. It may start at the point *o*, in which case there will be no current between the point *p* and the point *o* and a modified pulse, indicated by the dotted line *q*, will result. Under other conditions the pulse may not start until it reaches a further point, as for instance *r*. In that case the modified pulse will be as indicated by the dotted line *s*. If the oscillations of the system under the influence of the regulator produce a phase difference between the main voltage impressed upon the electroionic valve and the voltage which causes the arc to start, the pulse may not start until it reaches the point *t* giving a pulse of the form shown by dotted line *u*, thus reducing the effective voltage on the motor without a corresponding loss in energy in the regulator.

If the conditions do not cause the arc to start at all the pulse will be entirely eliminated and so it will be understood that pulse waves may under certain conditions be eliminated in such a way that the frequency of the current delivered to the motor will be different from that of the source. The modification or elimination of pulses will vary the effective voltage, or alter the time distribution of energy and thus the motor will be regulated to compensate for variations in conditions.

While the electroionic valve is illustrated herein as arranged in the armature circuit in a direct current motor and the primary circuit in an alternating current motor so as to control the main or working current, it may equally well be arranged in other circuits.

Fig. 8 shows an electroionic regulator for a three-phase induction motor. For the purpose of simplicity, only the regulating apparatus employed for one circuit is represented, but it will be understood that similar regulating apparatus will be provided for the second circuit. The third circuit requires no regulating apparatus as it is the common return circuit for the other two circuits.

While regulating apparatus for pulses of both directions is illustrated, only the apparatus which is employed for pulses of one direction will be described in particular as the other is precisely the same.

The main or working current which is supplied from the source to the primary circuit passes through the electroionic regulating valve 18. This valve is controlled by an electroionic valve or relay 19 which in turn is controlled by an electroionic valve or relay 20, which is controlled by an auxiliary dynamoelectric machine or tachometer 21 driven by the motor. The tachometer voltage is opposed to that of a battery 22 and normally predominates. When the tachometer voltage varies, the effect of the relay 20 varies and in turn causes the effect of the relay 19 to vary, which finally varies the effect of the regulating valve 18.

The regulating valve 18 has an anode 23, a cathode 24, and an auxiliary or ignition anode 25. An ignition battery 26 or other source furnishes the current which creates the ignition spark or arc between the ignition anode 25 and the cathode 24. The ignition current from the ignition battery 26 passes through the electroionic relay 18 so as to be controlled thereby.

The relay 19 has an anode 27, an auxiliary anode 28, and a heated cathode 29. The anode 27 is connected to the cathode 24. The cathode 29 is heated by current supplied from a battery 30. The auxiliary anode 28 may have the form of a grid. A supplemental voltage is impressed between this auxiliary anode and the cathode 29 by a battery 31 to control the effect of the relay 19.

The relay 20 is connected in series with the battery 31 so as to control the supplemental voltage impressed upon the relay 19. The relay 20 has an anode 32, a heated cathode 33, and an electromagnet 34. The heated cathode 33 is supplied with current from a battery 35. The relay circuit between the relay 19 and the relay 20 is provided with a variable resistance 36 by means of which the supplemental voltage may be adjusted. The electromagnet 34 is connected to the tachometer and its energization depends upon the difference between the tachometer voltage and the battery voltage. The tachometer voltage in this instance always predominates.

When the tachometer voltage varies the electromagnet 34 distends or alters the discharge path between the anode 32 and the cathode 33 of the relay 20. The supplemental voltage between the auxiliary anode 28 and the cathode 29 is then altered to vary the voltage drop between the anode 27 and cathode 29 of the relay 19 and thus change the ignition voltage between the ignition anode 25 and the cathode 24 to control the starting point or the formation of the pulse between the anode 23 and the cathode 24 of the regulating valve 18. The result is, that the pulses through the electroionic regulating valve 18 are altered, modified or eliminated to produce the required energy to maintain practically constant motor speed under variations in load or other conditions.

The tachometer field 37 is energized by current from a battery 38 and adjusted or regulated or controlled by field rheostat 39.

The speed and torque of the motor may be adjusted at will by varying the tachometer field by means of the field rheostat, or in other ways, as for instance, by varying the resistance 36 in the relay circuit or the resistance 40 in the tachometer circuit.

In addition to the apparatus which has been described to regulate the pulses of one direction, similar apparatus is shown to regulate the pulses of the opposite direction. Both electroionic valves are connected between the terminals 41 and 42. Similar regulating apparatus is provided for the second circuit and the electroionic regulating valves thereof are connected between the terminals 43 and 44. The same tachometer will serve to control all the relay magnets 34.

The electroionic regulating valve may, of course, assume various forms and be arranged in other circuits to regulate the motor. It may be controlled in many ways and respond to different conditions. Thus the auxiliary relay 20 may be eliminated and the sensitive circuit may act directly upon the relay 19 or upon the electroionic valve 18 in a manner similar to that shown for the sensitive circuit in Figs. 1 and 2. Or the relay 19 may be eliminated and the relay 20 may act directly upon the electroionic valve 18. The tachometer has been adopted merely as one way to obtain a variable voltage under variations in motor speed.

For the purpose of simplifying the illustration, batteries have been shown herein in many instances but it will be understood that other sources of supply may be employed.

Although the regulating apparatus has been particularly described as adapted to regulate the motor to maintain constant speed, it is capable of being adapted to regulate the motor to obtain other results.

The embodiments of the invention which have been given herein have been selected merely for simplicity of illustration and it will be understood that the invention as defined by the claims hereof is susceptible of many embodiments and adaptations depending upon conditions and the results to be obtained.

Having thus described my invention, what I desire to claim is

1. The combination of a machine for converting energy and subject to varying load and supply conditions, an electroionic valve associated therewith to regulate said machine simultaneously with the varying conditions, and means simultaneously responsive to said conditions and creating an electromotive force which controls the effect of said valve.

2. A controller for a dynamo electric machine, subject to varying conditions of energy conversion, comprising an electroionic valve whose action is substantially coincidently controlled by and in accordance with the varying conditions and producing and impressing corrective influences upon the machine in substantial synchronism with the varying conditions.

3. In combination with a dynamo-electric machine subject to varying load and supply conditions, an electroionic valve for controlling said machine substantially coincidently with the varying conditions, and means for controlling said valve in accordance with the operating conditions, said means having no inertia affecting the control.

4. In combination with a dynamo-electric machine influenced by varying load and supply conditions, an electroionic valve for controlling said machine simultaneously with the varying conditions, and an auxiliary dynamo-electric machine for controlling said valve in accordance with the varying conditions and substantially synchronously therewith.

5. The combination of a machine for converting energy and subject to varying load and supply conditions, an electroionic valve for controlling said machine, and means coincidently responsive to the varying conditions and directly modifying the discharge in said valve in accordance with the varying conditions, whereby the machine is regulated.

6. The combination of a motor subject to fluctuations in speed, an electroionic valve having internal means for controlling the discharge thereof to control the operation of said motor, and a tachometer driven by said motor and electrically and frictionlessly interlinked with said means to cause corrective influences to be impressed upon said motor in synchronism with the fluctuations in the speed thereof.

7. In a system of electrical distribution in which there is a dynamo electric machine to be controlled and an electroionic valve for controlling it, the combination of means within the valve for controlling the quantity of the discharge thereof, and a controlling circuit in which the machine to be controlled substantially instantaneously produces an effect which is directly impressed upon said means to substantially synchronously vary the discharge to control the machine.

8. In an electrical system of distribution having an electroionic valve and a dynamo electric machine subject to variations in load or power conditions to be controlled thereby, the combination of a controlling circuit synchronously registering the machine variations and simultaneously and instantaneously impressing its registrations directly upon the valve to vary the discharge thereof in synchronism with the varying conditions.

9. A regulator for a dynamo electric machine subject to varying load or power conditions, comprising an electroionic valve whose discharge characteristics may be varied to control the machine, and means subject to variations comparable and in synchronism with the variations to which the machine is subjected for registering and instantaneously and directly transferring the effect of such variations to said valve to cause the discharge thereof to produce corrective influence in accordance and in synchronism with the varying conditions.

10. A regulator for a motor subject to fluctuations in speed, comprising a tachometer driven by the motor, an electroionic valve having internal discharge control characteristics for regulating the current supplied to the motor, and means frictionlessly interlinking said tachometer and said valve to cause said tachometer to produce variations in the discharge of said valve in synchronism with the speed fluctuations of the motor whereby corrective influences are impressed on the motor in synchronism with the fluctuations.

11. A regulator for an electric motor, having an electroionic valve for regulating the current to the motor coincidently with varying operating conditions of the motor, and means subject to varying operating conditions of the motor and controlling the action of said valve, said means having no mechanical inertia affecting the regulation.

12. The combination of a dynamo electric machine subject to varying conditions of load, line voltage and the like, means directly and coincidently responsive to the varying conditions, and an electroionic valve whose discharge characteristics are instantaneously responsive to said means for controlling said machine.

13. The combination of a machine for converting energy and subject to varying load and power conditions, an electroionic valve for controlling said machine, and means coincidently responsive to the varying conditions and varying coincidently the discharge characteristics of said valve.

14. In combination a dynamo electric machine subject to varying conditions of load, line voltage and the like, an electroionic valve for controlling said machine, and means having the same time constant as that of said machine for varying the discharge characteristics of said valve coincidently and in accordance with the varying conditions.

15. A controller for a dynamo electric machine subject to varying conditions of energy conversion, comprising an electroionic valve for controlling the machine, and means for controlling the action of said valve substantially coincidently with the varying conditions.

16. In combination a motor subject to varying load and power conditions, an auxiliary machine coincidently simulating the operation of said motor, and an electroionic valve coincidently controlled by said auxiliary machine for controlling said motor.

17. The combination of a motor subject to varying load, line voltage and the like, an auxiliary machine having a time constant dependent upon the time constant of said motor and coincidently simulating the operation thereof, and an electroionic valve instantaneously responsive to said auxiliary machine for controlling said motor.

18. The combination of a motor subject to varying load and power conditions, an electroionic valve controlling the current supplied to said motor, and means instantaneously and simultaneously responsive to variations in the operation of said motor for affecting the discharge characteristics of said device to vary the current supplied to the motor.

19. In combination a dynamo electric machine subject to varying load and power conditions, an electroionic valve whose inherent characteristics may be varied to control said machine, and means having no motion independently of said machine but coincidently controlled by the varying conditions for varying the characteristics of said valve coincidently with the varying conditions whereby said machine is regulated.

20. A controller for a dynamo electric machine subject to varying conditions of energy conversion, comprising means substantially coincidently responding to the varying conditions, and an electroionic valve controlled substantially instantaneously by said means and substantially coincidently acting upon the machine to control the same in accordance with the varying conditions.

21. The combination of a machine for converting energy and subject to varying load and supply conditions, an electroionic valve associated therewith and having a main discharge path, an auxiliary electrode within the valve and controlling the main discharge therein, and means simultaneously responsive to the varying conditions and acting coincidently therewith upon the auxiliary electrode to regulate the machine in accordance with the varying conditions.

22. The combination of a dynamo electric machine subject to varying load and supply conditions, an electroionic valve associated therewith and having a main discharge path, an auxiliary discharge path within the valve and affecting the main discharge therein, and means responding coincidently with the varying conditions and simultaneously controlling the auxiliary discharge to regulate the machine according to the varying conditions.

In witness whereof I have hereunto subscribed my name.

Dr. F. W. MEYER.